H. HOWARD.
Steam Radiator.
No. 58,258.
Patented Sept. 25, 1866.
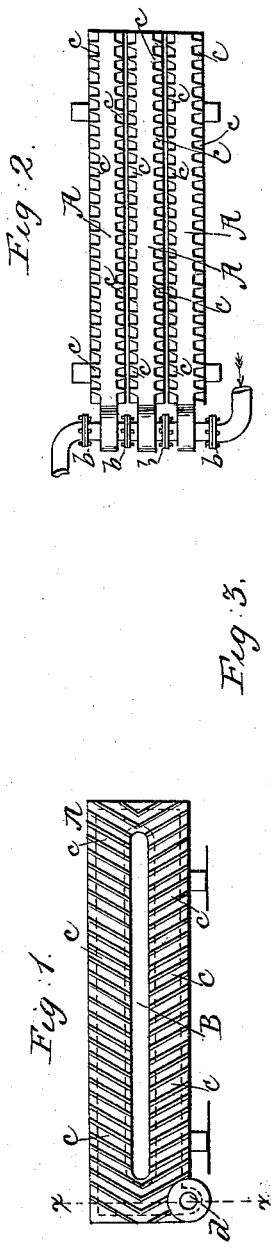
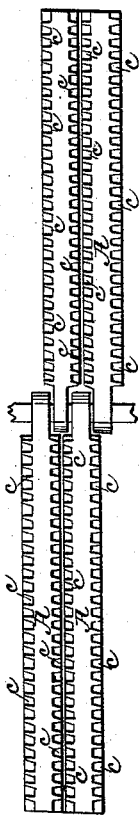
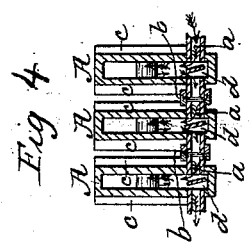
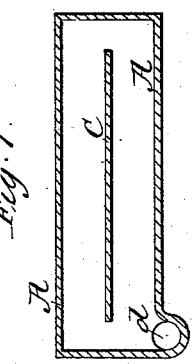
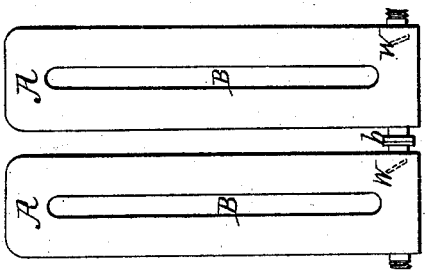
Witnesses
W Burris.
H. H. Young.
Inventor.
Henry Howard.
By David A Burr

UNITED STATES PATENT OFFICE.

HENRY HOWARD, OF SPRINGFIELD, MASSACHUSETTS.

STEAM-RADIATOR.

Specification forming part of Letters Patent No. 58,258, dated September 25, 1866.

*To all whom it may concern:*

Be it known that I, HENRY HOWARD, of Springfield, in the county of Hampden and State of Massachusetts, have invented a new and useful Improvement in Steam-Radiators; and I do hereby declare that the following is a full, clear, and exact description thereof, reference being had to the accompanying drawings, forming a part of this specification, in which—

Figure 1 is a side elevation of one section of my improved radiator placed on edge, illustrating clearly the arrangement of the obliquely-disposed ribs or flanges upon its sides or faces. Fig. 2 is a top view of the radiator when constructed of three sections placed on edge, and all extending in the same direction from the main steam-channel. Fig. 3 is a similar view of the sections arranged alternately on each side of the steam-channel. Fig. 4 is a vertical section in the line $x\ x$ of Fig. 1, showing the arrangement of the diaphragm, which I place in the steam-passage between the induction and eduction apertures pierced at one end of the radiating section. Fig. 5 illustrates my arrangement of the sections of my radiator when placed on their ends instead of upon their edges. Fig. 6 is a top view of the sections arranged as represented in Fig. 5, and Fig. 7 a modification of Fig. 1.

Similar letters of reference indicate like parts in each of the figures.

The nature of my invention consists in the use, arrangement, and combination of two or more steam-radiating sections, each consisting of an endless steam pipe or flue of any desired shape, having induction and eduction steam-ports formed therein, opposite to each other, at one extremity thereof, said sections being connected together at said ports only, in such manner as to leave thereat a continuous steam-channel through the entire series; also, in breaking the exterior faces of the sections with narrow projecting ribs or flanges, obliquely disposed, in parallel rows, arranged at opposite inclinations on the opposite sides of each section, so as that, when brought together in forming the radiator, the current of air passing between the sections shall be impeded and divided, while the heating-surface of the apparatus is also greatly extended; finally, in diverting the current of steam in each section from the direct channel afforded by the opposite arrangement of the induction and eduction apertures therein, by placing a thin diaphragm centrally between these apertures across a right line passing through them, and at a slight inclination from the direction of the steam-current, thus causing the steam entering the section upon one side of the diaphragm to be deflected upward and circulate through the flue or channel forming the section before passing out on the other side thereof.

In the accompanying drawings my improved radiator is illustrated as constructed of sections A A, each composed of an endless pipe or flue arranged in the form of a parallelogram, as seen in the side elevations, Figs. 1 and 5. These sections may be cheaply cast of iron, in one piece, either of the open form shown by the elevation, Fig. 1, in which the flue is made to inclose an open air space or passage, B, or else of the compact form shown in the sectional Fig. 7, in which the flue or endless channel is obtained by the interposition of a longitudinal diaphragm, C, in the center of the chamber A, said diaphragm being attached to each side and extending nearly to each end of the interior of the chamber. I prefer the open form of section illustrated in Fig. 1, as the exterior radiating-surface thereof is much greater than in that shown at Fig. 7.

The induction and eduction ports $a\ a'$ of each section are pierced opposite to each other in a right line, at one end or corner of the section, and, being properly turned and finished, are fitted with coupling-tubes $b\ b$, which, in connection with right-and-left screw-collars, enable steam-tight connections to be made between any desired number of sections.

Parallel flanges $c\ c\ c$ are formed obliquely upon the outer surface of each section A, the direction of the inclination of these flanges being directly opposed, not only upon the different sides, but also upon the upper and lower portions of each section when placed on edge, as illustrated in Fig. 1.

Thin diaphragms $w\ w$, Fig. 4, and dotted lines, Fig. 5, are placed across the space between the induction and eduction steam-apertures in each section A, at an angle inclined from the induction-aperture upward. These diaphragms *w w* are but slightly larger than the steam-apertures and serve to deflect the current upward through the endless flue constituting the section, causing, or rather aiding, the circulation of steam through the same.

The several sections A A of the radiator may be placed on their edges and combined either all on one side of the main steam-connection, as seen in Fig. 2, or alternately on opposite sides thereof, as seen in Fig. 3, or else they may be set upon end and used singly or in rows, as seen in Fig. 5. When thus set upon end the eduction and induction apertures are pierced opposite to each other, through the lower portion of the edges of the sections, as seen in Figs. 5 and 6, instead of through the sides, as in Figs. 2 and 3.

In fact the position of the sections is immaterial, and may be varied as found most useful and convenient so long as the steam is made to enter and leave each section at one end or in one corner thereof through apertures which are pierced therein opposite to each other.

The flanges *c c* projecting from the sides break the air-spaces between opposite sections brought together in forming the radiator, and serve to so divide and impede the current of air as to promote greatly the efficiency of the apparatus.

I am aware that narrow flat chambers or sections having apertures for the entrance and discharge of steam thereto and therefrom pierced opposite each other centrally in the sections have been used in constructing steam-radiators; but in these the circulation of the steam is more or less imperfect, because of its diffusion in every direction upon entering the chamber. In my radiating sections, however, a perfect circulation of steam from the main channel is obtained by placing it at one corner or extremity of the section, and by so dividing the chamber as to cause it to assume the form of an endless flue.

Although I find the diaphragms *w w* placed between the induction and eduction apertures of each section useful and efficient, still I do not consider them essential to the successful operation of my apparatus, and contemplate their omission when found advisable under certain contingencies.

Having thus fully described my invention, what I claim therein as new, and desire to secure by Letters Patent, is—

1. A steam-radiator consisting of one or more steam chests or sections, each having the form of an extended endless pipe or flue, so arranged as that the steam shall enter and leave the same at one extremity thereof through apertures pierced therein opposite to each other, all substantially in the manner and for the purpose herein set forth.

2. Breaking the exterior surface of said extended endless steam chests or flues into parallel ribs or flanges obliquely disposed at opposite inclinations, substantially in the manner and for the purpose herein set forth.

3. The use of diaphragms placed centrally between the induction and eduction apertures pierced at opposite points in a radiating steam chest or flue, as hereinbefore described, substantially in the manner and for the purpose herein set forth.

The foregoing specification of my improvement in steam-radiators signed by me this 31st day of October, A. D. 1865.

HENRY HOWARD.

In presence of—
G. E. VAN DERBURGH,
WOODHULL HELM.